United States Patent
MeLampy et al.

(10) Patent No.: US 7,633,943 B2
(45) Date of Patent: Dec. 15, 2009

(54) SYSTEM AND METHOD FOR PROVIDING RAPID REROUTING OF REAL-TIME MULTI-MEDIA FLOWS

(75) Inventors: Patrick J. MeLampy, Papperell, MA (US); Ephraim W. Dobbins, Windham, NH (US); Stephen E. Norton, Merrimac, MA (US); Robert F. Penfield, Concord, MA (US)

(73) Assignee: Acme Packet, Inc., Burlington, MA (US)

( * ) Notice: Subject to any disclaimer, the term of this patent is extended or adjusted under 35 U.S.C. 154(b) by 134 days.

(21) Appl. No.: 11/368,922

(22) Filed: Mar. 6, 2006

(65) Prior Publication Data

US 2006/0187927 A1 Aug. 24, 2006

Related U.S. Application Data

(63) Continuation of application No. 09/911,304, filed on Jul. 23, 2001, now Pat. No. 7,031,311.

(51) Int. Cl.
*H04L 12/28* (2006.01)
(52) U.S. Cl. .................... 370/392; 370/401
(58) Field of Classification Search ................. 370/216, 370/252, 254, 351, 389, 392, 400, 401
See application file for complete search history.

(56) References Cited

U.S. PATENT DOCUMENTS

| | | | |
|---|---|---|---|
| 5,371,731 A * | 12/1994 | Pratt et al. | 370/216 |
| 5,513,345 A | 4/1996 | Sato et al. | 714/4 |
| 5,999,518 A | 12/1999 | Nattkemper et al. | 370/258 |
| 6,032,266 A | 2/2000 | Ichinohe et al. | 714/9 |
| 6,085,245 A | 7/2000 | Kaycee et al. | 709/224 |
| 6,335,927 B1 | 1/2002 | Elliott et al. | 370/352 |

(Continued)

FOREIGN PATENT DOCUMENTS

GB XP-002096069 11/1995

(Continued)

OTHER PUBLICATIONS

Schulzrinne et al., "RTP: A Transport Protocol for Real-Time Applications," Network Working Group, Jan. 1996, pp. 1-66.

(Continued)

*Primary Examiner*—Hong Cho
(74) *Attorney, Agent, or Firm*—Thomas, Kayden, Horstemeyer & Risley, LLP

(57) ABSTRACT

A system and method for providing rapid rerouting of real-time transport protocol (RTP) multi-media flows is disclosed. Generally, a first endpoint is connected to a second endpoint, wherein the first endpoint comprises a transceiver, software stored within the first endpoint defining functions to be performed by the first endpoint, and a processor configured by the software. The processor is configured to perform the steps of, performing flow processing on a data packet received at a first endpoint, from a second endpoint, removing a multi-protocol label switching (MPLS) tag from the data packet, translating a source address and destination address of the data packet, and determining a forwarding destination if more than one destination address of the data packet is provided.

5 Claims, 7 Drawing Sheets

U.S. PATENT DOCUMENTS

| | | | |
|---|---|---|---|
| 6,353,616 B1* | 3/2002 | Elwalid et al. | 370/443 |
| 6,404,733 B1 | 6/2002 | Shah et al. | 370/216 |
| 6,535,481 B1 | 3/2003 | Andersson et al. | 370/225 |
| 6,584,093 B1 | 6/2003 | Salama et al. | 370/351 |
| 6,643,254 B1* | 11/2003 | Kajitani et al. | 370/217 |
| 6,678,250 B1* | 1/2004 | Grabelsky et al. | 370/241 |
| 6,687,247 B1 | 2/2004 | Wilford et al. | 370/392 |
| 6,728,205 B1* | 4/2004 | Finn et al. | 370/217 |
| 6,741,569 B1 | 5/2004 | Clark | 370/252 |
| 6,754,181 B1 | 6/2004 | Elliott et al. | 370/351 |
| 6,765,931 B1 | 7/2004 | Rabenko et al. | 370/493 |
| 6,775,269 B1 | 8/2004 | Kaczmarczyk et al. | 370/352 |
| 6,775,280 B1* | 8/2004 | Ma et al. | 370/392 |
| 6,785,273 B1 | 8/2004 | Verma | 370/389 |
| 6,813,242 B1* | 11/2004 | Haskin et al. | 370/229 |
| 6,982,975 B1* | 1/2006 | Aramaki et al. | 370/388 |
| 7,031,311 B2 | 4/2006 | MeLampy et al. | 370/392 |
| 2001/0014857 A1* | 8/2001 | Wang | 704/231 |
| 2001/0029546 A1* | 10/2001 | Motoyama | 709/235 |
| 2001/0048660 A1 | 12/2001 | Saleh et al. | 370/216 |
| 2002/0004843 A1 | 1/2002 | Anderoson et al. | 709/238 |
| 2002/0009073 A1 | 1/2002 | Furukawa et al. | 370/352 |
| 2002/0227915 | 3/2002 | Foti et al. | 370/392 |
| 2002/0112073 A1 | 8/2002 | MeLampy et al. | 709/240 |
| 2002/0114282 A1 | 8/2002 | MeLampy et al. | 370/238 |
| 2002/0137490 A1 | 9/2002 | Gallant et al. | 455/411 |
| 2002/0145975 A1 | 10/2002 | MeLampy et al. | 370/235 |
| 2002/0172157 A1 | 11/2002 | Rhodes | 370/238 |
| 2003/0014644 A1 | 1/2003 | Burns et al. | 713/182 |
| 2003/0033418 A1 | 2/2003 | Young et al. | 709/230 |
| 2004/0114595 A1 | 6/2004 | Doukai | 370/389 |
| 2004/0223488 A1 | 11/2004 | Roy et al. | 370/393 |
| 2005/0265228 A1 | 12/2005 | Fredette et al. | 370/216 |

FOREIGN PATENT DOCUMENTS

| | | |
|---|---|---|
| JP | 2000-349776 A | 12/2000 |
| JP | 2001-053794 A | 2/2001 |
| WO | WO 98/20647 | 5/1998 |

OTHER PUBLICATIONS

Swale et al., "Requirement for the MIDCOM Architecture and Control Language," MIDCOM Working Group, Internet Draft, Feb. 2001, p. 1-24.

Srisuresh et al., "Middlebox Communication Architecture and Framework," Network Working Group, Internet Draft, Feb. 2001, pp. 1-37.

Martin et al., "SIP Through NAT Enabled Firewall Call Flows," Midcom Working Group, Internet Draft, Feb. 2001, pp. 1-63.

Rosenberg et al., "Getting SIP through Firewalls and NATs," Internet Engineering Task Force, Internet Draft, Feb. 22, 2001, pp. 1-57.

Eliot Lear, "A Middle Box Achitectural Framework," Network Working Group, Internet Draft, Jan. 31, 2001, pp. 1-12.

Rosenberg et al., "SIP Traversal through Residential and Enterprise NATs and Firewalls," Internet Engineering Task Force, Internet Draft, Mar. 2, 2001, pp. 1-41.

Carpenter et al., "Middleboxes: Taxonomy and Issues," The Internet Society, Internet Engineering Task Force, Internet Draft, Apr. 2001, pp. 1-24.

B. Biggs, "A SIP Application Level Gateway for Network Address Translation," Internet Draft, Mar. 2000, pp. 1-16.

Kuthan et al., "Middlebox Communication: Framework and Requirements," Internet Engineering Task Force, Internet Draft, Nov. 2000, pp. 1-23.

P. Srisuresh, "Framework for Interfacing with Network Address Translator," NAT Working Group, Internet Draft, Apr. 2000, pp. 1-57.

Mart et al., "Firewall Control Requirements," MidCom Bof, Internet Draft, Nov. 2000, pp. 1-16.

Melinda Shore, "H.323 and Firewalls: Problem Statement and Solution Framework," Internet Draft, Feb. 3, 2000, pp. 1-19.

Thernelius et al., "SIP Firewall Solution," SIP Working Group, Internet Draft, Jul. 2000, pp. 1-32.

N. Freed, "Behavior of and Requirements for Internet Firewalls," Network Working Group, Internet Draft, Oct. 2000, 1-14.

D. Newman, "Benchmarking Terminology for Firewall Performance," Network Working Group, The Internet Society, Aug. 1999, pp. 1-49.

F. Finlayson, "IP Multicast and Firewalls," Network Working Group, The Internet Society, May 1999, pp. 1-23.

S. Bellovin, "Firewall-Friendly FTP," Network Working Group, Feb. 1994, pp. 1-7.

Montenegro et al., "Sun's SKIP Firewall Traversal for Mobile IP," Network Working Group, The Internet Society, Jun. 1998, pp. 1-45.

Gaynor et al., "Firewall Enhancement Protocol (FEP)," Network Working Group, The Internet Society, Apr. 1, 2001, pp. 1-22.

Andrew Molitor, "A Firewall Solution for Voice Over IP," Aravox Report, Aravox Technologies, pp. 1-2.

"Aravox Firewall Benefits," Aravox Technologies, pp. 1-9.

Dr. Andrew Molitor, "Can Voice Over IP Work without Dynamic NAT?", Aravox Report, Aravox Technologies, pp. 1-2.

Dr. Andrew Molitor, "Deploying a Dynamic Voice over IP Firewall with IP Telephony Applications," Aravox Report, Aravox Technologies, pp. 1-5.

Dr. Andrew Molitor, "Firewall Control for IP Telephony," Aravox Report, Aravox Technologies, pp. 1-5.

Molitor et al., "High Performance H.323 Firewalling for VoIP Solutions," Aravox Report, Aravox Technologies, pp. 1-2.

"What is Unique about IP Telephony?," Aravox Technologies, Spring 2001 IP Expo, pp. 1-16.

Dr. Andrew Molitor, "Securing VoIP Networks with Specific Techniques, Comprehensive Policies and VoIP-Capable Firewalls," Aravox Report, Aravox Technologies, pp. 1-3.

Utz Roedig, "Security Analysis of IP-Telephony Scenarios," Presentation by Darmstadt University of Technology, pp. 1-28.

F. Thernelius, "SIP, NAT, and Firewalls," Master Thesis, Ericsson Department of Teleinformatics, May 2000, pp. 1-69.

Bellovin, "Distributed Firewalls" ;login: Magazine, Nov. 1999, pp. 37-39 (1-10).

"Firewall ActiveX Control for Microsoft Windows," Distinct Corporation, 1996-1998, pp. 1-45.

Jiri Kuthan, "Firewall Control, " Flow Processing Control Protocol, p. 1-3.

Crosswell, "Advanced Networking Information," Columbia University Academic Information Systems, Mar. 21, 2000, pp. 1-22.

"Cisco Secure PIX Firewall Software v5.2," Cisco Data Sheet, pp. 1-7.

"Cisco Secure PIX 500 Firewalls," Cisco Products & Technologies, 1992-2000, pp. 1-3.

"Cisco Secure PIX Firewall," Internet Product Watch, Apr. 12, 2001, pp. 1-2.

"Media Firewall," www.marconi.com, 2000, pp. 1-4.

"Media Firewall," www.marconi.com, 2001, pp. 1-3.

"ATM Switch Network Modules: LAN, WAN, and Service Interfaces for TNX-210, TNX-1100, ASX-200BX, ASX-1000 and ASX-1200 ATM switches," www.marconi.com, 2000, pp. 1-12.

"Marconi's Next GEneration IP and Multi-Service Switch Router Enables End-to-End Differentiated Services," www.marconi.com, Nov. 6, 2000, pp. 1-3.

"Transforming Communications and Information with Enterprise-Focused Ethernet Solutions," www.marconi.com., pp. 1-6.

"Marconi Expands Networking Product Portfolio with Solutions for Emerging Enterprise Needs," www.marconi.com, Jul. 24, 2000, pp. 1-2.

"Marconi to Showcase 'Smart and Fast' Switch/Router at CeBIT, " www.marconi.com, Jan. 22, 2001, pp. 1-2.

"Macroni Demonstrates Converges Distance-Learning Solutions at Educause 2000," www.marconi.com, Oct. 10, 2000, pp. 1-2.

"Firewall Security," www.marconi.com, Oct. 30, 2000, pp. 1-2.

"SA-400, IP/ATM Firewalling for ATM Networks," www.marconi.com, pp. 1-4.

"Media Firewall," www.marconi.com, 2001, pp. 1-3.

"NSX-9500, Routing, LANE, and Firewalling Services for ATM Backbone Networks," www.marconi.com, 2000, pp. 1-4.

"The New Public Network: Scalable, Flexible, PSTN Features, IN Features, Signalling Gateway," www.marconi.com, 1999, pp. 1-4.

"Sphericall Voice Internetworking Multiplexer (VIM) Product Overview," www.marconi.com, 2001, pp. 1.

"ServiceOn Accountant 2.0: Per-call Usage Based Billing for Differentiated Services," www.marconi.com, Dec. 12, 2000, pp. 1-2.

"Marconi extends Optical Networking; Introduces Advanced Multiservice Platform," www.marconi.com, Jun. 6, 2000, pp. 1-2.

"ATM Switched Network Modules Product Overview," www.marconi.com, 2001, pp. 1-4.

"Security is the Key," Marconi Interface, May 2000, p. 30.

"Firewall Switching Agent," www.marconi.com, 2001, pp. 1-4.

"ESX-2400 and ESX-4800 Firewall Accelaration Switches," www.marconi.com, 2001. pp. 1-8.

"IP/ATM Firewalling for ATM Networks," www.marconi.com, 2001, pp. 1-4.

"ESX-2400 and ESX-4800 Product Overview," www.marconi.com, 2001, pp. 1-3.

"FSA Product Overview," www.marconi.com, 2001, pp. 1-2.

Parthenois, "Hackers Beware," Telephony, Jun. 18, 2001, pp. 1-2.

"Aravox Expands IP Platform to Include VoIP," CommWeb.com, May 30, 2001, pp. 1.

"Aravox Expands IP Network Services Platform to Carriers and xSP's Deploying VoIP," biz.yahoo.com., May 29, pp. 1-2.

"Aravox Expands IP Network Services Platform to Carriers and Service Providers Deploying VoIP," tmcnet.com, May 29, 2001, pp. 1-2.

www.aravox.com/solutions, 2001, p. 1.

"The Aravox Network Services Platform Solutions for Backbone Carriers," www.aravox.com/backbone, 2001, p. 1.

"The Aravox Network Services Platform Solution for Access Providers," www.aravox.com/access, 2001, p. 1.

"The Aravox Network Services Platform Solution for Enterprises," www.aravox.com/enterprise, 2001, p. 1.

"SIP ALG for Firewall Traversal (Application Level Gateway)," www.microappliances.com, 2000, p. 1.

"SIP Firewall/Outbound Proxy Server (ALG)," www.microappliances.com, 2000, p. 1.

"Microappliances SIP Phone (Active X)," www.microappliances.com, 2000, p. 1.

"Convergence Data and Telephony Platform," www.microappliances.com, 2000, p. 1.

Rosenberg, et al., "A Framework for Telephony Routing Over IP", XP-002201353, Internet: <URL://www.faqs.org/rfcs/rfc2871.html>, Jun. 2000, pp. 1-19.

Rosenberg, et al., "A Border Gateway Protocol 4 (BGP-4)", XP-002201776, Internet: URL:http://www.faqs.org/rfcs/rfc1771.html, Mar. 1995, pp. 1-2.

Article entitled "The Layered Approach: The OSI Model", XP-000917810, 1991, pp. 446-456.

Article entitled: "Dynamic QoS control of multimedia applications based on RTP", by Busse, et al., dated 1996 Elsevier Science B.V., pp. 49-58.

Japanese Office Action Re: JP 2002-214486 A, mailed Dec. 12, 2006.

Japanese Office Action Re: JP 2002-214486 A, mailed Mar. 27, 2007.

* cited by examiner

SYSTEM AND METHOD FOR PROVIDING RAPID REROUTING OF REAL-TIME MULTI-MEDIA FLOWS

CROSS-REFERENCE TO RELATED APPLICATION

This application is a continuation of U.S. Pat. No. 7,031,311, entitled, "System and Method for Providing Rapid Rerouting of Real-Time Multi-Media Flows", Ser. No. 09/911,304 filed Jul. 23, 2001.

FIELD OF THE INVENTION

The present invention relates to telecommunication networks, and more particularly, is related to real-time multi-media flows.

BACKGROUND OF THE INVENTION

The public switched telephone network (PSTN) has evolved into an efficient real-time, multi-media communication session tool wherein users can pick up any one of nearly one billion telephones and dial any one of nearly one billion endpoints. Several developments have enabled this automated network, such as numbering plans, distributed electronic switching and routing, and networked signaling systems.

Unfortunately, the PSTN is not currently capable of routing an actual communication session on anything other than an address that conforms to the hierarchy present in the PSTN since telephone numbers and their parts are used to discover a path to an endpoint of the communication. Portable mechanisms require a phantom or shadow number to direct the communication session through the network.

Similar to the manner in which the PSTN is based on a hierarchy, the Internet is based on an Internet Protocol (IP). IP messages are routed or forwarded from one link te the next (i.e., from a source of the data flow to a destination of the data flow). Each IP packet contains an IP address, which, in Internet Protocol version 4 (IPv4), has 32 bits. Each IP address also has a certain number of bits dedicated to a network portion and a certain number of bits dedicated to a host portion.

IP routers are used to take a packet from one network (or link) and place it onto another network (or link). Tables are located within IP routers that contain information or criteria used to determine a best way to route a packet. An example of this information may be the state of network links and programmed distance indications. Unfortunately, IP routers typically route packets by destination IP address, which does not assist in finding a proper route for transportation. There are some exceptions to this routing system, however, by using intelligent devices on both sides of a network domain, it is possible to allocate a temporary address to route a packet through a network and restore the original address on the far side of the network when the packet leaves the network. This is the basis for many current virtual private network (VPN) products and is understood in the art.

Another exception to the routing system includes multi-protocol label. switching (MPLS). MPLS is based on a technology developed by Cisco Systems, Inc. of San Jose, Calif. called tag switching. This method of routing IP packets allows a destination IP address to potentially be separated from the route that the packet actually takes through a network. One of the best uses of MPLS is to create a VPN or virtual leased lines (VLL). The MPLS tags can effectively encapsulate the routing of data packets through a network.

In summary, it is concluded that data networks base real forwarding of IP packets on IP destinations. IP destinations, in turn, are associated with network topology and, like the telephone network, are used to deliver packets. MPLS tags and paths can provide override forwarding for IP packets based on a set of rules that is tied to the IP address portion used for routing, such as, for example, a forward equivalence class (FEC).

To ensure that the network elements (e.g., switches in the telephone network, routers in the data network) can perform their associated tasks, they should know the status of adjacent communication links and available routes; signaling systems are used to provide this information. In telephone networks, typical signaling systems used are either SS7 compliant or are equivalent to SS7. The signaling system provides information about individual links, link sets, routes, etc. In data networks, protocols such as border gateway protocol (BGP), interior gateway protocol (IGP), open shortest path first (OSPF), etc., are used to determine link states and routes.

In the telephone networks, the signaling system is also used to establish an end-to-end path (i.e., ISDN User Part (ISUP)) through the network. Unfortunately, in IP networks, there is no end-to-end path allocation. Instead, to engage in a communication session, a system to associate endpoints with names or purposes is needed.

There are currently no known universal registries on the Internet. A universal registry with the domain name E164.com has been proposed by NetNumber.com, Inc., of Lowell, Mass. This universal registry development is based on a proposal by NueStar, Inc., which is now responsible for administering the North American numbering plan (NANP). This proposal calls for using the current domain name service (DNS) and formatting the numbers into URLs in a way that can be resolved using DNS servers. In this manner, each telephone number could be registered into a DNS server and distributed to all other DNS servers. The tail end of a DNS query could be a resource record, which points to a lightweight directory access protocol (LDAP) directory server.

The suggestion from the ITU to use Universal Portable Telephone (UPT) numbers for IP endpoints to avoid overlapping traditional wired telephone numbers is valid and would allow for addressable IP endpoints. It is possible to combine the above two proposals to enable Internet calling to and from the PSTN. Unfortunately, there are several limitations to this technology. These limitations include: DNS distribution and replication has significant latency; DNS address resolution can be slow; DNS servers may not be capable of handling the number of projected addresses; DNS servers are incapable of managing duplicate entries (except through round robin techniques); DNS employs parallel update mechanisms, which may result in unintentional duplicate entries; private network addresses or addressing gateways may result in duplicate entries or matches; no policy exists to handle the management of the resources requested; and, no solution exists to handle the number overlap between the PSTN and the data networks.

Due to most current telecommunication endpoints receiving service through a PSTN-based system, a gateway is used to facilitate a multi-media flow between a packet data network and a PSTN. Gateways are installed at edges between data networks and voice networks, wherein the gateways are used to convert multi-media (and signaling) to ensure communication. There are several strategies for routing calls received by gateways to other gateways described in the art. Two of these strategies are full mesh routing and hierarchical routing. Full mesh routing is the standard method described in most of the softswitching architectures. Session initiation protocol (SIP) is the inter-softswitch signaling system because it supports an anywhere-to-anywhere signaling model. In this model, all softswitches have a virtual connection to all other softswitches for completing calls. Routing tables are utilized that can be used to direct traffic to a softswitch based on policy provided by the softswitch maker.

Unfortunately, when running a network that comprises many softswitches, the owner of the network has many different points of policy management to maintain a full mesh. Such policy management issues include assuring that each softswitch knows the IP address of each other softswitch and what telephone numbers or PSTN to which they connect. When running softswitches from multiple vendors, further management issues arise. The management issues are then more complicated due to the fact that the equipment may be managed through different links.

When the number of softswitches deployed grows large, the sharing of different routes is likely. In the full mesh routing arrangement, the routing of calls may be difficult since several different egress softswitches may be full or not functioning. For example, if a carrier has thirty softswitches that can handle national long distance, and the network is running at about 50% full, then each originating softswitch will likely have to try an average of 15 separate softswitches before finding one with a non-blocked route. This search effort can be greatly reduced if a pure random distribution is implemented; however, it is assumed that some routes would be preferred over others due to cost or quality, thereby exacerbating the problem.

Certain simple gateways, such as, but not limited to, the Cisco AS5300, can forward SIP-based call requests to a SIP proxy server. Unfortunately, these gateways have low densities and frequently lack the sophistication of softswitches in setting up routing policies. These routers, therefore, cannot be interconnected to create networks without a softswitch controller.

Therefore, guiding real-time packet flows through certain thresholds, which is generally required to create a high-quality border between various IP networks, is important. Without proper guidance, the packets would flow whichever way the networks would allow, thereby subjecting packets to disruptive paths, as well as upstream and downstream failures.

SUMMARY OF THE INVENTION

In light of the foregoing, the preferred embodiment of the present invention generally relates to a system and method for providing rapid rerouting of real-time transport protocol (RTP) data flows.

Generally, with reference to the structure of the system, the system utilizes a first endpoint, connected to a second endpoint, wherein the first endpoint comprises a transceiver, software stored within the first endpoint defining functions to be performed by the first endpoint, and a processor. These functions may, alternatively, be defined via use of hardware such as, switches, or controllers that may be located within an application specific integrated circuit. The processor is configured by the software to perform the steps of, receiving a data packet at a first endpoint from a second endpoint, performing flow processing on said data packet, removing a multi-protocol label switching (MPLS) tag from said data packet, translating a source address and destination address of said data packet, and determining a forwarding destination if more than one destination address of said data packet is provided.

The present invention can also be viewed as providing methods for rapidly rerouting real-time multi-media flows. In this regard, one such method, among others, can be broadly summarized by the following steps which may be used individually, or in combination: receiving a data packet at a first endpoint from a second endpoint; performing flow processing on the data packet; removing a multi-protocol label switching (MPLS) tag from the data packet; translating a source address and destination address of the data packet; and determining a forwarding destination if more than one destination address of the data packet is provided.

Other systems and methods of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

The invention can be better understood with reference to the following drawings. The components of the drawings are not necessarily to scale, emphasis instead being placed upon clearly illustrating the principles of the present invention. Moreover, in the drawings, like referenced numerals designate corresponding parts throughout the several views.

DETAILED DESCRIPTION OF THE PREFERRED EMBODIMENT

The rerouting system of the present invention can be implemented in software, firmware, hardware, or a combination thereof. In the preferred embodiment of the invention, which is intended to be a non-limiting example, a portion of the rerouting system is implemented in software that is executed by a computer, for example, but not limited to, a personal computer, workstation, mini computer, or mainframe computer.

The software portion of the rerouting system, which comprises an ordered listing of executable instructions for implementing logical functions, can be embodied in any computer-readable medium for use by, or in connection with, an instruction execution system, apparatus, or device such as a computer-based system processor-containing system, or other system that can fetch the instructions from the instruction execution system, apparatus, or device and execute the instructions.

In the context of this document, a "computer-readable medium" can be any means that can contain, store, communicate, propagate or transport the program for use by or in connection with the instruction execution system, apparatus or device. The computer-readable medium can be, for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disk read-only memory (CD ROM) (optical). Note that the computer-readable medium could even be paper or another suitable medium upon which the program is printed, as the program can be electronically captured, via for instance, optical scanning of the paper or other medium, then compiled, interpreted or otherwise processed in a suitable manner, if necessary, and then stored in a computer memory.

Figure 1:
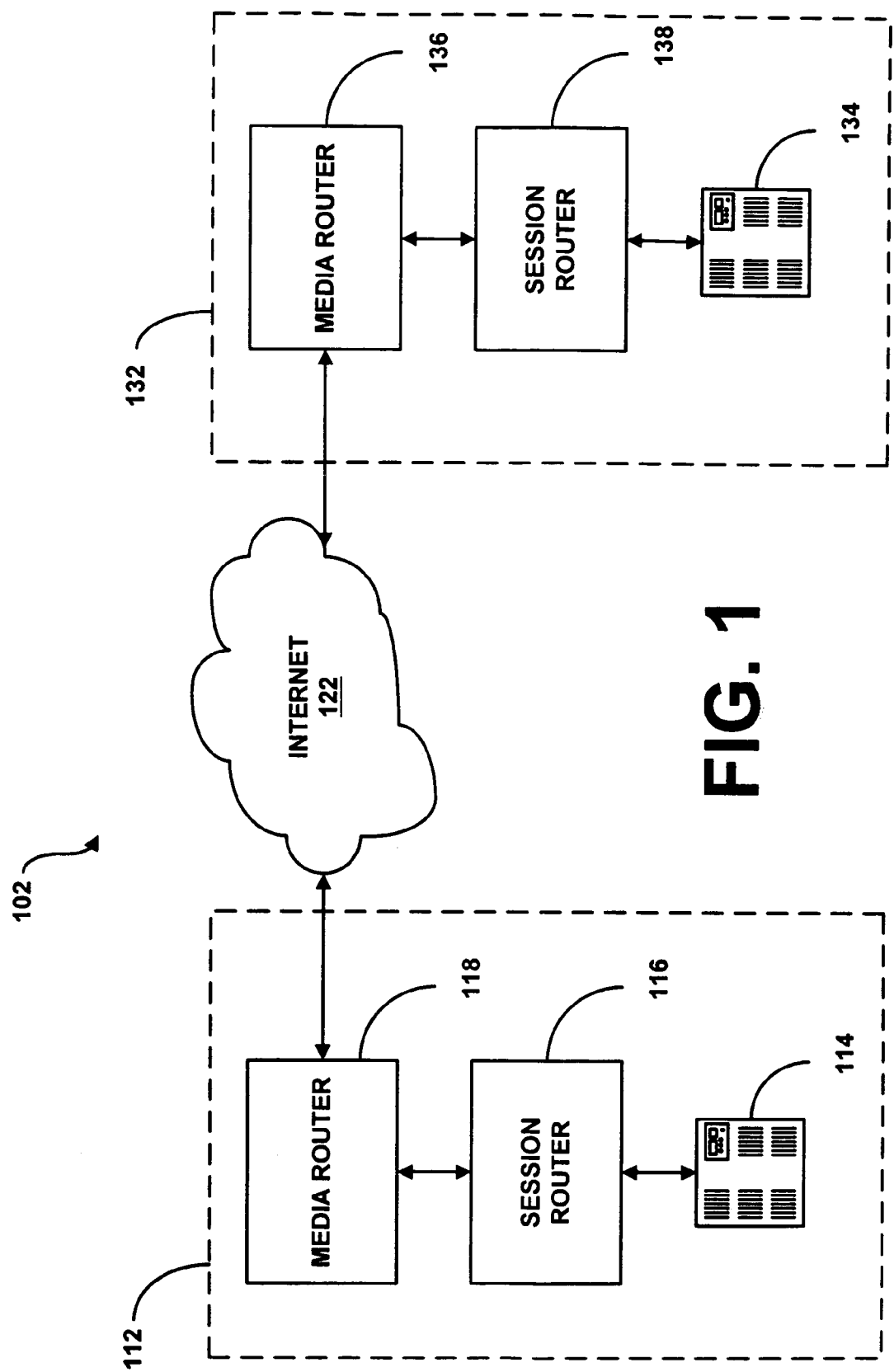
FIG. 1 is a block diagram that illustrates a communication network in which the present rerouting system may be implemented.

FIG. 1 is a block diagram that illustrates the present rerouting system implemented in connection with a communication network 102. As shown by FIG. 1, a first carrier network 112 comprises a first SIP phone 114, such as those produced by Pingtel of Massachusetts, U.S.A., a first session router 116, and a first multi-media router 118. A second carrier network 132 is connected to the first carrier network 112, via the Internet 122, having a second SIP phone 134, a to second multi-media router 136, and a second session router 138 therein. It should be noted that any device, SIP or non-SIP, may be included within the first and second carrier networks 112, 132 that can implement communication between the networks 112, 132. Other RTP data sources include, but are not limited to, integrated access devices (IAD), VoIP gateways (Cisco AS5300, Sonus GSX), and multi-media sources (PCs, IP-PBXs). Further, communication between the networks 112, 132 may instead be provided via a wide area network (WAN) or local area network (LAN). Also, the Internet 122, may instead be a data network domain since the multi-media routers 118, 136 are utilized between two domains within the Internet 122.

Alternatively, a router, such as, but not limited to, a border router, may be located between the first and second multi-media routers 118, 136 to assist in communication between the first and second carrier networks 112, 132. It should be noted, however, that an additional router, such as a border router, is not necessary in providing communication between the first and second carrier networks 112, 132. Instead, communication from the first SIP phone 114 to the second SIP phone 134 may be provided by the first and second multi-media routers 118, 136, as is further explained in detail hereinbelow. It should also be noted that communication may be from a session router, directly to the Internet 122, and not through the multi-media routers 118, 136.

The first and second session routers 116, 138 provide session initiation protocol (SIP) and telephony routing over IP (TRIP) protocol support as described in detail by the presently pending application entitled "System and Method for Assisting in Controlling Real-Time Transport Protocol Flow Through Multiple Networks," by MeLampy et al., having Ser. No. 09/844,204, and filed on Apr. 27, 2001, the disclosure of which is incorporated herein by its entirety.

Figure 2:
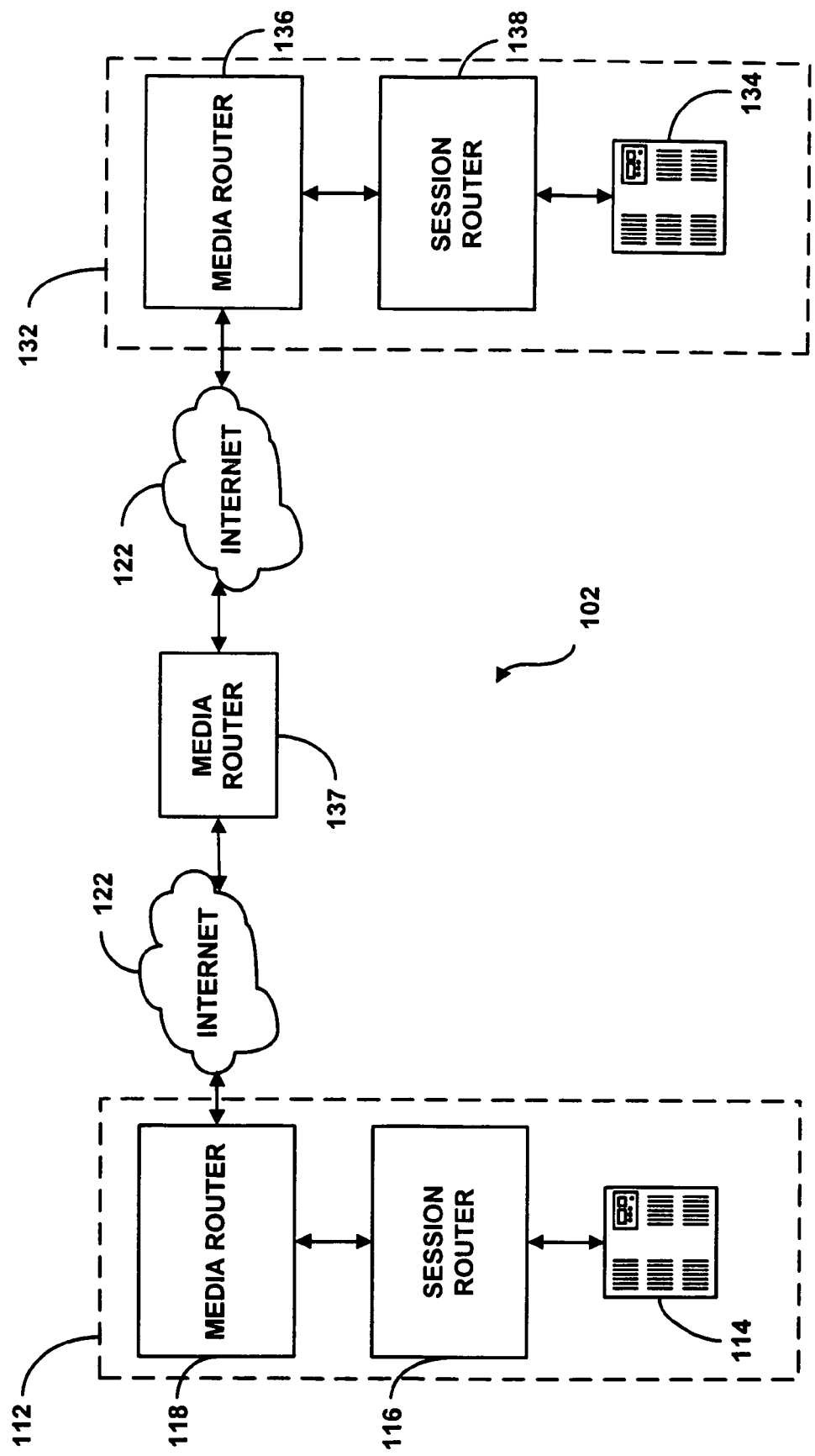
FIG. 2 is a block diagram illustrating the use of three multi-media routers instead of the two illustrated by FIG. 1, in accordance with an alternate embodiment of the invention.

Additional multi-media routers may be provided between the first multi-media router 118 and the second multi-media router 136. FIG. 2 is a block diagram illustrating the use of three multi-media routers instead of two, in accordance with an alternate embodiment of the invention. As such, the first multi-media router 118, located within the first carrier network 112, communicates with a third multi-media router 137, via the Internet 122. The third multi-media router 137, in turn, communicates with the second multi-media router 136, within the second carrier network 132, via the Internet 122.

Figure 3:
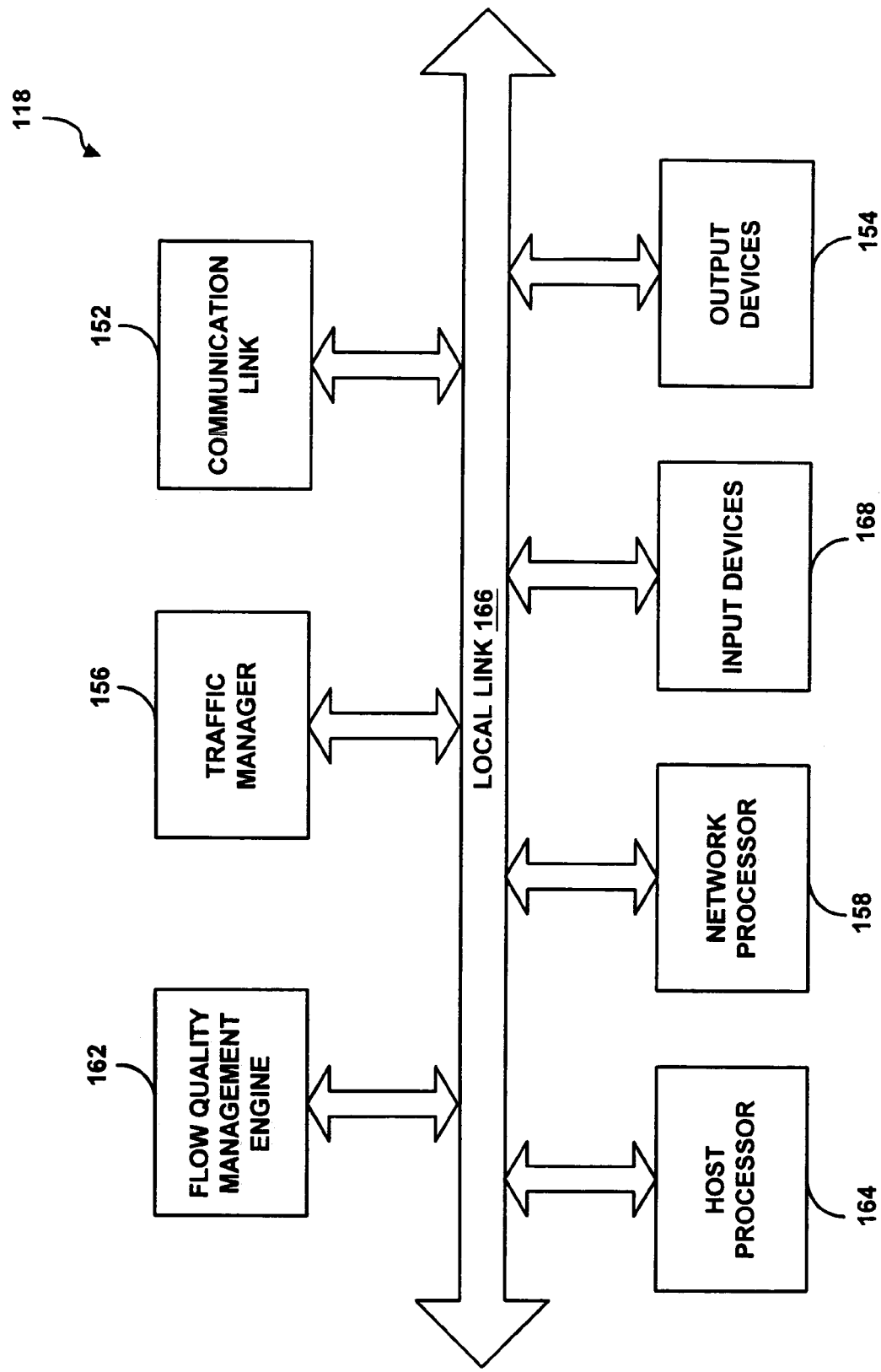
FIG. 3 is a block diagram further illustrating one of the multi-media routers illustrated by FIGS. 1 and 2.

FIG. 3 is a block diagram further illustrating a multi-media router 118, 136, 137 (FIG. 1) (referred to hereinafter as 118) in accordance with the preferred embodiment of the invention. As shown by FIG. 3, a communication link 152, such as, but not limited to, a transmission control protocol (TCP) socket connection, is located on the multi-media router 118 for providing a means for connecting to another endpoint such as a session router or another multi-media router. As known in the art, TCP is a connection-oriented transport layer protocol that provides reliable full-duplex data transmission. Alternatively, another type of socket connection may be used. Output devices 154 may also be located within the multi-media router 118. Preferably, a private network is established between the multi-media router 118 and a session router for command and control of the multi-media router 118.

The communication link 152 may also be a personal computer memory card international association (PCMCIA) slot. The PCMCIA slot may be used for purposes of allowing software upgrades to the multi-media router 118 via use of an external device such as, but not limited to, a flash card or external drive. It should be noted that more than one communication link 152 may be provided within the multi-media router 118.

The multi-media router also comprises a traffic manager 156. The traffic manager 156 is preferably used for measuring and enforcing IFP session data flow rates, or traffic, for providing traffic measurement. An example of a commercially available traffic manager 156 is an NPX5700 traffic manager sold by MMC Networks located in California, USA. Essentially, the traffic manager 156 measures the number of data packets that flow through the communication link 152. The traffic manager 156 works in concert with a network processor 158 (described hereinbelow) such that once a forwarding decision is made, the traffic manager 156 queues the received packet into its respective IP flow and associated priority.

As is known in the art, the traffic manager 156 comprises a memory for temporarily storing received data packets. From an inbound perspective, the multi-media router 118 is able to monitor RTP data flows and enforce maximum data rates by either dropping packets or marking them as eligible for discarding if they are outside a bandwidth allocated for the data flow.

Preferably, a session router is responsible for allocating bandwidth for the data flow and specifying which data flows may be allocated to pass through the multi-media router 118 to a destination, although specification may also be performed directly through the multi-media router 118. Alternatively, if the multi-media router 118 has not been assigned to allow a specific data flow to pass, the data flow is not allowed to pass through the multi-media router 118. The traffic manager 156 is also instructed by the session router to accept a specific amount of data in accordance with an allocated bandwidth and bit rate. Therefore, if data is received at a higher bit rate than allowed by the session router, the data received at the higher bit rate is not transmitted. It should be noted that the characteristics specified by the session router may instead be programmed directly into the multi-media router 118 without using the session router.

The multi-media router 118 is also capable of providing traffic shaping when transmitting received data packets, as explained in more detail hereinbelow. Traffic shaping specifies a specific order in which received data packets that have been temporarily stored within the multi-media router 118 are transmitted from the multi-media router 118 to a destination. In addition, traffic shaping allows the specification of an amount of bandwidth to be allocated for the transmission of the data packets.

The multi-media router 118 is capable of generating flow quality statistics for RTP data flows. Further, the multi-media router 118 is able to generate the flow quality statistics from the RTP packets as they flow through the communication network 102. In some cases the statistics are only relevant for the link between multi-media routers, as shown by FIG. 1. In other words, the multi-media router 118 will not be able to measure flow quality up to an endpoint. Jitter and latency are two measurements of flow quality that fall into this category.

Preferably, one or more statistics are stored for each flow through the multi-media router 118. These statistics may include, but are not limited to, latency, jitter, a number of octets per packet, and/or the number of dropped packets, each of which is described in detail hereinbelow. It should be noted that other statistics may also be stored with regard to each data flow through the multi-media router 118. To generate statistics for each data flow, the multi-media router 118 runs a proprietary version of a protocol, such as, but not limited to, real-time control protocol (RTCP), between connected multi-media routers to determine latency. Jitter and dropped packet statistics can be generated autonomously by the multi-media router 118. The following describes how latency, jitter and dropped packets can be determined in the absence of RTCP information.

In order to measure latency for a data flow, the multi-media router 118 communicates with another endpoint on the data flow. Presumably, the other endpoint is another multi-media router, although it need not be. Preferably, the subject of this communication is a test packet that the endpoint loops back to the multi-media router 118 attempting to determine RTP data flow latency. The multi-media router 118 receiving the looped packet compares when the packet was received to when the packet was sent, thereby determining a round trip time. The round trip time is then cut in half to approximate the one-way time, which is the latency.

Rather than using a proprietary way to perform packet looping, as has been described hereinabove, RTCP packet format can be used between two multi-media routers. This format allows extraction of a timestamp of the sender (from a send report) and putting it into the looped packet (in a receive report), as well as an estimate of how long it took to loop the packet.

Jitter is a measurement of the variation of the gap between packets on a flow. An alternative definition is that it is the variance in latency for a flow. The multi-media router 118 can measure jitter for an RTP data flow as it transits the multi-media router 118. When a data packet hits a network processor 158, which is also located within the multi-media router 118, a timer is started that runs until the next packet for that RTP data flow arrives. The gap between packets is added to an aggregate to maintain a "mean" jitter value. The "mean" jitter value can also be compared to a min/max value in a flow record to determine if a new min/max jitter value is established. It should be noted that the flow record may be located within a network processor memory (not shown) that is located within the network processor 158. It should also be noted that the memories located within the multi-media router 118 may all be located within a single memory stored within, or outside of the multi-media router 118. In the situation where this process may be too processor intensive, jitter samples can be aggregated and min/max calculations can be performed on a periodic basis using the aggregated information.

Dropped packet, or lost packet, processing in the absence of an RTCP based mechanism may be accomplished on an RTP flow using two scoreboard arrays of booleans that are used to track when a packet is missing, and whether the packet appears within a jitter window. Alternate methods of processing packets may be used. It should be noted that a jitter window is typically implemented in voice gateways to compensate for fluctuating network conditions. The jitter window is a packet buffer that holds incoming packets for a specified amount of time before forwarding them for decompression. The process has the effect of smoothing the packet flow, thereby increasing the resiliency of a compressor/de-compressor (CODEC) to packet loss, delaying packets, and producing other transmission effects. Preferably, the jitter window is defined by a session router, although it may be directly defined via the multi-media router 118.

Each entry in a scoreboard array represents whether a packet having a specific sequence number has been received by a multi-media router. The scoreboard array may be located within the network processor memory or within any local or distant memory. Each array of booleans also has a counter which tracks how many entries have been marked "missing." Preferably, all entries are initially marked as "received."

As the sequence numbers are tracked in the network processor 158 and missing packets are detected, specifically, a packet with a sequence number that has incremented more than one, the appropriate entry in the current array is marked "missing" and the missing counter is incremented. Preferably, two arrays are sized as the maximum number of packets in the jitter window. These two arrays are hereinafter referred to as the current array and the aged array. When the current array reaches the maximum jitter window the aged array is re-initialized and becomes the current array and the current array becomes the aged array. Before the aged array is erased, the counter for dropped packets is retrieved and accumulated for the data flow.

If, instead, an out of order old packet is received, wherein the sequence number is less than the current sequence number, the network processor 158 looks up the entry for the sequence number in either the current or aged array depending on lateness of the packet. If the network processor 158 finds the entry marked missing and changes the entry, the network processor 158 then decrements a missing packet counter of the array that is used for keeping track of missing packets. If the packet is not marked as missing, then the network processor 158 designates that the packet is a duplicate. If the sequence number is so old that the packet dates back further than the depth of the jitter window, then the network processor 158 does not perform a lookup. It should be noted that this method of performing dropped packet counting is more accurate than that obtainable using RTCP.

The following describes how latency, jitter and dropped packets can be determined by using RTCP information, as is described in detail in RTP standard RFC1889, entitled, "A Transport Protocol for Real-Time Applications," dated January 1996, by Schulzrinne, et. al. Another reference is "IP Telephony with H.323," by Kumar, et. al., ISBN 0-471-39343-6, which describes the measurement of statistics as is performed in the art today. The multi-media router 118 can process an RTCP stream that may accompany an RTP data flow received from an endpoint. This processing can be done instead of the above process, or as an adjunct to the above process. The RTCP flow can be examined during an RTP session and several quality statistics can be derived with varying levels of accuracy. RTCP packets that are of particular interest include a sender report and a receiver report. The two reports are almost identical with the difference being that the sender report includes sender transmission information and per receiver information, while the receiver report includes the per receiver information.

Session statistics in a receiver report messages that are of particular interest in deriving latency, jitter and dropped packets include, fraction lost, cumulative lost, highest sequence number received, interarrival jitter, last session report timestamp (LSR), and/or delay since LSR. The fraction lost session statistic provides the fraction of RTP packets, from a particular source, that have been lost since the last sender report, or receiver report, message was sent. The cumulative lost session statistic provides a total number of RTP packets lost from a particular source since the start of a session. This number does not include late packets, which are for all intents and purposes lost. Duplicate packets, as are identified by the RTP specification referenced hereinabove, are also counted as received so that they may compensate for a missed packet and further qualify the accuracy of this measurement.

The value of the highest sequence number received session statistic can be tracked from the sender report, or the receiver report, message to message and, in conjunction with the cumulative lost statistic, may be used to determine the number of RTP packets that should have flowed within a session.

The LSR time message sent and delay since the LSR session statistics relate to a receiver of a last sent sender report message echoing back to a sender of the sender report message, a sender report network time protocol (NTP) timestamp and how long the receiver took to turn the sender report message around and send the receiver report. Essentially, the receiver can mark the time the receiver report message is received and determine round-trip delay by subtracting the LSR (when the sender report was sent) and delay since the last session report (DLSR) (message processing delay) from the current time.

Session statistics unique to a sender report message comprise a sender report NTP timestamp, a sender packet count, and a sender octet count. The sender report NTP timestamp session statistic has been described in detail hereinabove. The sender packet count session statistic provides a total number of RTP data packets sent to an endpoint via the multi-media router 118. In addition, the sender octet count session statistic provides a total number of payload octets transmitted in RTP data packets by the sender since the session started.

Given the data available from RTCP packets, the number of lost packets, the total number of packets, and a level of near instantaneous latency and jitter, on a per-flow basis, are derived. The calculation of each of these four metrics is discussed in detail hereinbelow.

The number of lost packets may be generated directly from the cumulative lost statistic that is passed in the receiver report message. Unfortunately, this measurement is somewhat inaccurate in that its generation erroneously counts duplicate packets and late packets against what the expected count should be.

The total number of packets may be generated by comparing a highest sequence number received from the receiver report, to the receiver report initial value to determine a number of packets that were expected to flow. The lost packet count can then be subtracted from the number of packets that were expected to flow to determine an actual number of packets that were received. In accordance with an alternative embodiment of the invention, the sender record sender packet count statistic can be used to set the expected value.

With reference to latency, the LSR and DLSR fields in the receiver report message may be used by the destination of the receiver report message to determine round trip delay. Specifically, the destination of the receiver report message records the time when the receiver report message is received and subtracts both the LSR, namely, when the sender report was sent, and the DLSR, namely, how long it took the sender of the receiver report to send a receiver report.

Since the actual time the originator of the sender report receives the receiver report is needed, there is room for error in calculating latency. To minimize error in the calculation of latency, the sending multi-media router may maintain its own per flow last sender report time stamp. Thus, when the receiver record is received back at the sender, receiver record is subtracted from the current time as determined by the sending multi-media router. In addition, the DLSR from the receiver record message is subtracted from the current time of receiver record receipt, resulting in the round trip delay between the sending multi-media router and the originator of the receiver report.

Preferably, the NTP timestamp from the sender record message is compared to the LSR in the return receiver record message to ensure that the latency calculation is valid. If the timestamps do not match, then the calculations are not correct, and corrections may be made accordingly. One method of performing a correction may be to simply start over again when the next sender record message is received. It should be noted that the round trip latency is calculated from both sides of the RTP flow through the multi-media router 118 with the round trip value being halved to establish a one-way latency.

Referring now to the calculation of jitter. Jitter can be thought of as the standard deviation of packet inter-arrival times. Thus to measure jitter, one could set a timer after receipt of a first packet associated with a flow, then upon receipt of the next packet in the flow, stop the timer. This elapsed time represents a single sample of "inter-packet time." By taking several sequential measurements of inter-packet times, one can determine the average variability or jitter in a flow. To accurately determine a flow jitter, a certain number of samples should be recorded and averaged to eliminate the effects of a single out of tolerance measurement. This could be thought of as a window of time. Once the computation is made, there are ways to get the next computation. One way is a sliding window, where the oldest sample is dropped, and a new sample is added, after which, the average is computed. Thus, the average is recomputed with each sample in the sliding window. This provides a very accurate trend indication. A second way to compute the next window is to drop all samples, and start collecting data until a new sample set is obtained. This provides a very accurate "period" indication. Either mechanism may be used. It would also be beneficial to keep the "worst" measurement of latency, along with the "best" measurement of latency for understanding the quality of a network operation.

Returning to the block diagram of FIG. 2, a flow quality management engine 157 is provided within the multi-media router 118. The flow quality management engine 157 provides translation services within the multi-media router 118, quality measurement services, and detection and correction of upstream and downstream failures, each of which is discussed in detail hereinbelow.

The translation services performed by the flow quality management engine 157 within the multi-media router 118 comprise the capability to translate a source address, destination address, source port, destination port or any combination of these fields. The multi-media router 118 is also capable of removing and/or inserting a multi-protocol label switching (MPLS) tag in the IP header of the RTP data packet as it traverses the rerouting system 100. In addition, the multi-media router 118 is capable of inserting or modifying a diffserv codepoint located within the IP header of the RTP data packet, which, as is known in the art, is used to modify priority of the data packets.

The quality measurement services provided by the flow quality management engine 157, within the multi-media router 118, are provided on a per flow basis, wherein an RTP flow is defined by a source IP address, a destination IP address, a source port, and a destination port. Quality measurement preferably comprises maintaining current statistics for the RTP data flow within the network processor memory, as well as aggregate and min/max statistics for the RTP data flow where applicable. Examples of statistics that may be collected include latency, jitter and packet loss for a predefined window of time. It should be noted that the window can be identified via the session router or the multi-media router 118.

Aggregate statistics may include transmitted RTP data packets, dropped RTP data packets and duplicate RTP data packets. Minimum and maximum statistics, otherwise referred to as boundary statistics, may also be collected which may include latency, jitter and packet loss per window of time. Further discussion of latency, jitter, and packet loss is provided hereinabove with reference to the traffic manager 156.

Figure 4:
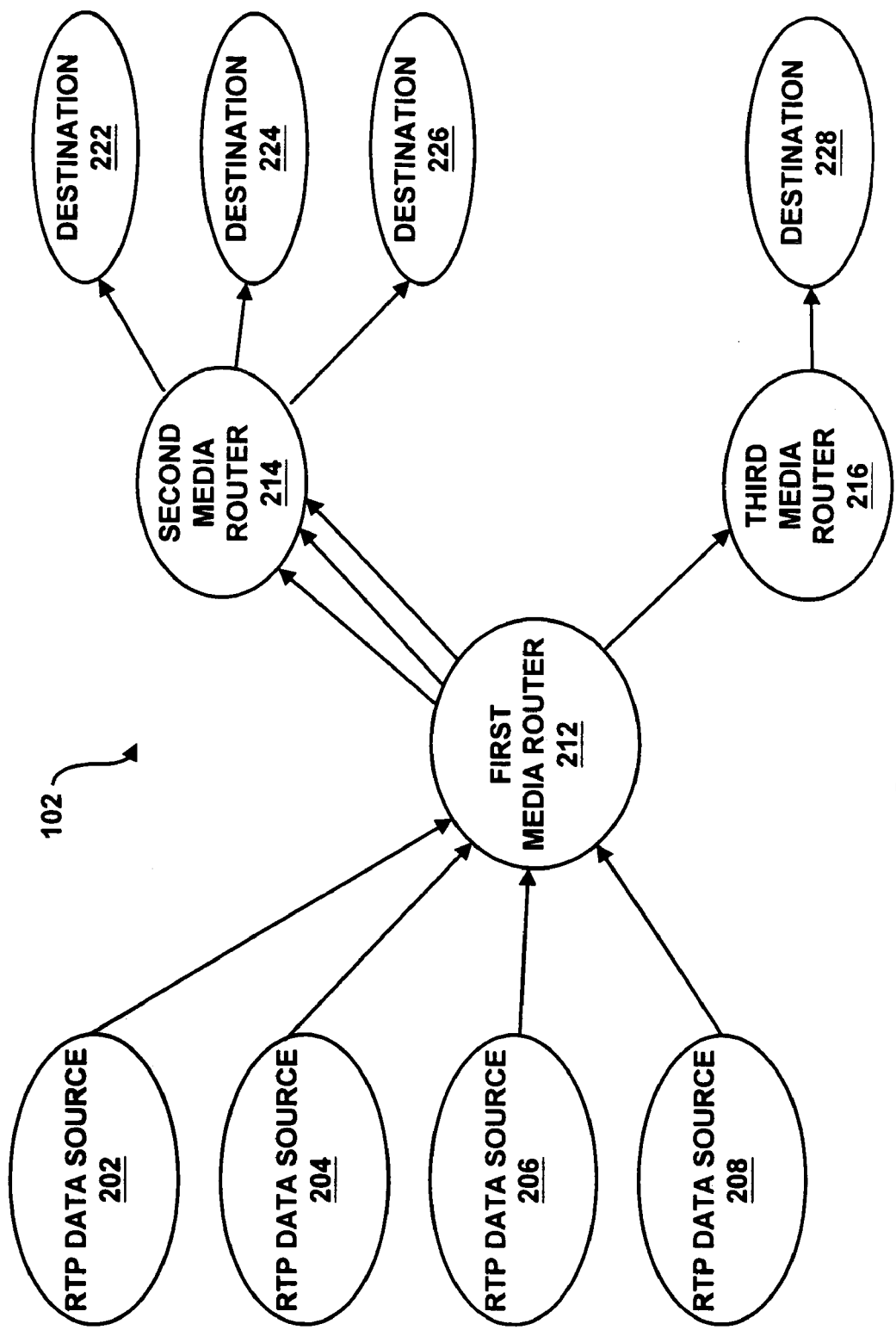
FIG. 4 is a block diagram that provides an example of a communication network for purposes of illustrating flow interruption detection performed by the multi-media router of FIG. 3.

As mentioned hereinabove, the flow quality management engine 157, within the multi-media router 118, also provides the detection and correction of upstream and downstream failures in the transmission of RTP data packets. One method used by the flow quality management engine 157 is detecting RTP data flow interruption. FIG. 4 is a block diagram that provides an example of a communication network for purposes of illustrating flow interruption detection.

As shown by FIG. 4, four separate RTP data flows originate from four separate RTP data sources 202, 204, 206, 208. It should be noted that the RTP data sources may include, but are not limited to, a SIP phone. Each of the four RTP data flows is transmitted to a first multi-media router 212, via at least one session router (not shown). The first multi-media router 212 then routes the RTP data packets to either a second or third multi-media router 214, 216 depending upon the originating source address-destination address pair that is stored in the first multi-media router 212 within the network processor memory. As shown by FIG. 4, the second multi-media router 214 has three simultaneous RTP data flows from the first multi-media router 212, while the third multi-media router 216 only has one RTP data flow from the first multi-media router 212. It should be noted that the number of multi-media routers, sources of RTP data flows, types of session routers, and destinations of RTP data flows may differ.

As shown by FIG. 4, the second multi-media router 214 forwards the RTP data packets to three different destinations 222, 224, 226. The destinations for the RTP data packets may be any device including, but not limited to, a SIP phone. The third multi-media router 216 also forwards received RTP data packets to a destination 228. Preferably, each multi-media router is individually responsible for detecting flow interruption, wherein there is a lack of RTP data packets longer than a threshold established for each RTP data flow.

In order to determine a flow interruption, each RTP data flow has an initial packet guard timer, and a subsequent packet guard timer. The guard timer starts either at the initial beginning of the session or upon receipt of a packet. If a new packet does not arrive, and the timer lapses, then a flow interruption has been detected. There are special packets that are sent to indicate that "silence suppression" is started. The guard timers must take this into account, so that a flow isn't reported as "interrupted" when in fact it is just complete silence.

If all RTP data flows, or at least a majority of the RTP data flows determined by either a percentage or a threshold number, have a flow interruption detected state, then it is likely that the first multi-media router 212 failed. To elaborate, a multi-media router is simultaneously setting and clearing timers for each and every flow (initial and subsequent packet guard timers). The multi-media router sends packets to next hop destinations. If the next hop destination is another multi-media router, and the flows arriving from the multi-media router, or a substantial portion of the flows, have flow interruption detected at the same time, then it is likely that the next hop multi-media router has failed. As an example, considering FIG. 4, RTP data packets flow from the RTP data source 202 to the RTP destination 222, and RTP data packets flow from the RTP destination 222 to the RTP data source 202 at the same time.

Specifically, RTP data packets flow from the RTP data source 202 to the first multi-media router 212, to the second multi-media router 214, to the destination 222, and visa-versa. The first multi-media router 212 re-transmits packets from the RTP data source 202 to the second multi-media router 214, and the second multi-media router 214 re-transmits RTP data packets from destination 222 to the first multi-media router 212. Note that in FIG. 4 the three RTP data flows are represented by arrows (wherein the reverse flows are not shown, but are implied). Also note that the second multi-media router 214 performs the flow interruption detection using the flow guard timers mentioned hereinabove. If all three flows are interrupted at the same time, there is a very good chance that first multi-media router 212, or a shared link between the first and second multi-media routers 212, 214, is no longer working. Thus, the second multi-media router 214 may make a decision as to where to send the RTP data packets going in the reverse direction. The second multi-media router 214 can alternatively forward packets to the third multi-media router 216 for forwarding to the RTP data source 202.

Alternatively, detection of flow interruption could signify that the path between the first multi-media router 212 and the second multi-media router 214 is not functioning. As a result, disruption of a first multi-media router path is detected by a cumulative detection of multiple individual RTP flow disruptions. Therefore, the second multi-media router 214 knows that the first multi-media router 212 is either not operational, or a broken path exists between the second multi-media router 214 and the first multi-media router 212. As a result, the second multi-media router 214 can respond by rerouting RTP data flows arriving from its destinations 222, 224, 226, to the four RTP data sources 202, 204, 206, 208 by using another data path besides the path that uses the first multi-media router 212.

A host processor 164 is also located within the multi-media router 118, which is connected to the traffic manager 156 via a local link 166. As known in the art, the local link 166 may be a bus, a dedicated path, and/or a data transmission means. The host processor 164, similar to the traffic manager 156, provides detection and correction of upstream and downstream failures. Methods used by the host processor 164 to detect and correct upstream and downstream failures in the transmission of RTP data packets include, but are not limited to, the use of link failures and external management events.

Referring to the use of link failures to detect and correct upstream and downstream failures, reference is made again to FIG. 4. If the second multi-media router 214 receives information regarding a link failure between the first multi-media router 212 and the second multi-media router 214, the information may be used to reroute RTP flow traffic. Examples of types of link failures include, but are not limited to, directly connected links where link layer hardware and drivers can report various link failures including, for example, loss of carrier, bit errors, excessive collisions, and alarms. These link failures are reported to the second multi-media router 214 directly through the multi-media router hardware and drivers, into the multi-media router network processor 158 where decisions for rerouting are made. The network processor 158 is discussed in further detail hereinbelow.

Link failures for links that are not directly connected to multi-media routers can be discovered by using numerous different methods, a few of which are provided hereinbelow. A first method of discovering a link failure involves implementing an open shortest path first (OSPF) protocol. OSPF protocol delivers link state topology continuously. A second way of discovering a link failure is by using a border gateway protocol 4 (BGP-4) that removes a reachable route that was in use by the multi-media router. To obtain OSPF link state information, the multi-media router 118 participates in OSPF information exchange, or flooding, with the multi-media router 118 as an interior gateway protocol (IGP) peer. Accordingly, to obtain BGP-4 withdrawn route information, the multi-media router 118 uses IGP (OSPF) participation. Specifically, when connected within a network, routing information is delivered via OSPF. Should an external route become unavailable, through a BGP-4 withdrawn route indication, the new external routing capabilities will be communicated internally through OSPF to all connected links as described by the protocol. Alternatively, direct participation in a BGP-4 exchange may provide withdrawn route information.

A third method of discovering a link failure is to use a heartbeat message, or poll, between active multi-media routers that are processing adjacent flows to ensure connectivity and share statistics. If the poll is not returned, then a link, or multi-media router, may be declared as unavailable.

The following is a description for use of external management events for the detection and correction of upstream and downstream failures. Network management systems, such as, but not limited to, the Hewlett Packard Openview, located in a network operations center (NOC) may become aware of a failure in a network. This event could be unintended, or it could be related to scheduled maintenance of the network. Specifically, SNMP can be used to monitor network links and hardware. The management system can discover hardware or network problems in different ways. In a first way, an SNMP message is sent from monitored equipment to the management system, commonly referred to as an SNMP trap. In a second way, a request for information is sent from the management system, and the monitored equipment responds with data. In both cases, the management system obtains information about the operation of the network and its physical links.

Thus, the management system may take a link out of service for maintenance purposes and communicate that the link is no longer available for use. OSPF and BGP-4 protocols may manage the reconfiguration and transmission of networking tables as may be necessary to reflect the change in link availability. As is known in the art, OSPF (and other interior routing protocols) and BGP-4 (and other external routing protocols) are used to communicate changes to networking tables contained within each network router located within the network. These tables are used to correctly forward packets from one link to another. Thus, if a routing change is administered, the routing tables in network routers become aware of the change. The multi-media router 118, under control of a session router, may comprise one or more policies which guide RTP data flows to a particular endpoint removed or disabled, thereby preventing any use of links being serviced.

As previously mentioned, a network processor 158 is also located within the multi-media router 118. The network processor 158 performs packet header inspection and packet forwarding decisions for rapid rerouting of RTP data flow packets. In addition, the network processor 158 supports multi-protocol label switching (MPLS) label extraction and insertion. Several methods of rapid routing may be provided by the network processor 158, namely, a load sharing arrangement, a secondary path arrangement, a newly routed path arrangement, and a network oriented route around arrangement.

The following is a description of the use of a load sharing arrangement for rapid routing. Each RTP data flow comprises RTP data packets having a sequence number that preferably starts at one and increments with each packet. Upon receipt of an RTP data packet, at ingress to a network, the RTP data packets are sent to different locations based upon, for example, an even/odd dispersion algorithm or a modulo division by the number of next multi-media routers algorithm. It should be noted that other dispersion methods may be used in accordance with alternate embodiments of the invention.

Figure 5:
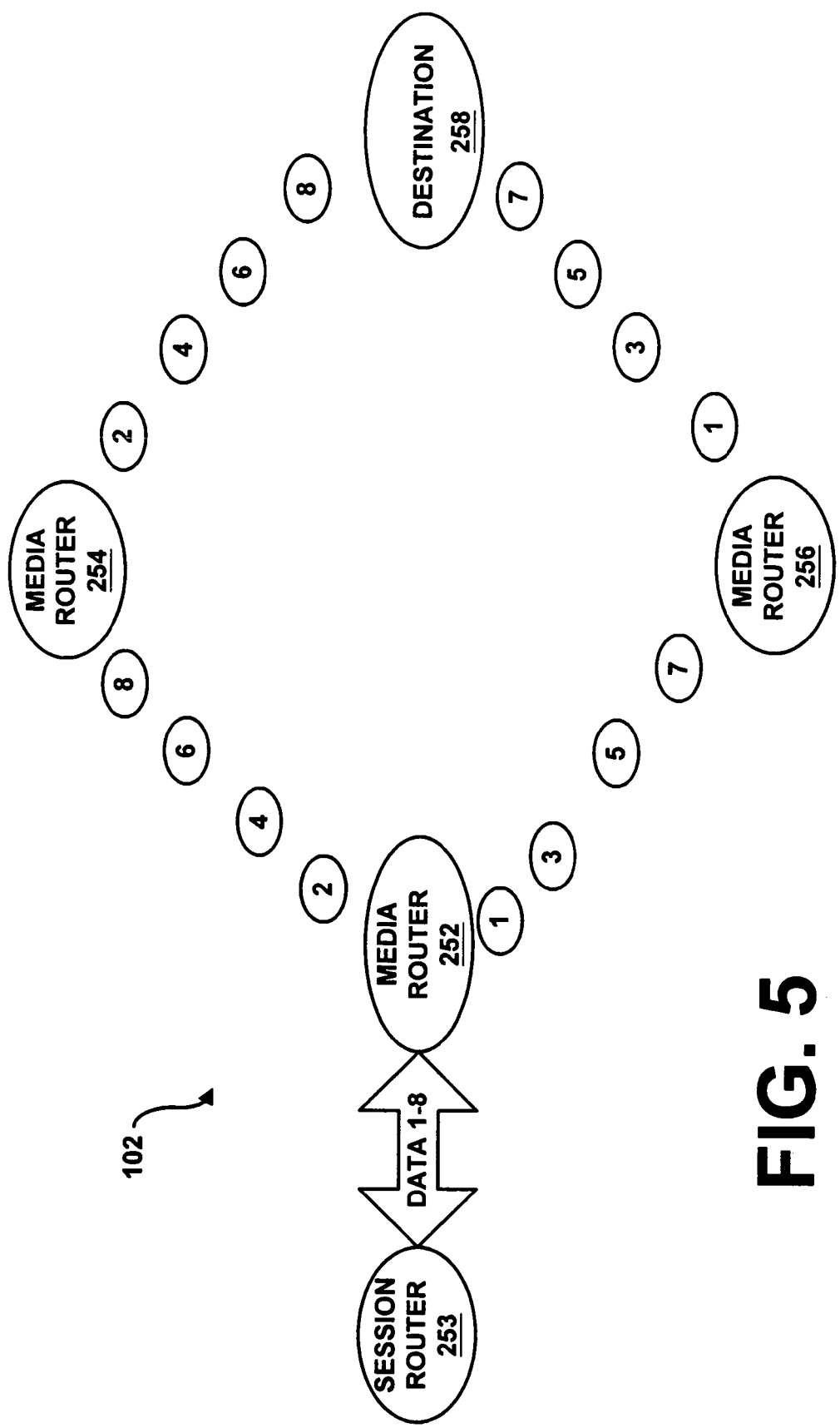
FIG. 5 is a block diagram that illustrates the load sharing arrangement used for rapid routing of RTP data packets.

The block diagram of FIG. 5 may be used to further explain the above-mentioned process. As shown by FIG. 5, even/odd dispersion is used. When an RTP data flow begins, the first data packet in the flow is given a sequence number of "1." The sequence number is placed into a header portion of the RTP data packet. For each subsequence packet, the sequence number is incremented. Thus, in FIG. 5, the even number packets traverse from a first multi-media router 252, to a third multi-media router 254, to a destination location 258, and the odd number packets traverse from the first multi-media router 252, to a second multi-media router 256, to the destination location 258. It should be noted that the first data packet may instead be given a different sequence number, as long as the sequence number is incremented for subsequent packets.

The following describes RTP data flow with reference to FIG. 5 in more detail. The first multi-media router 252 receives an RTP data flow upon ingress to the communication network 102 from a session router 253. It should be noted that the RTP data packets received from the session router 253 originally derive from a source or sources not shown. Even numbered RTP data packets are sent to a third multi-media router 254, and odd numbered RTP data packets are sent to a second multi-media router 256. Both the second and third multi-media routers 254, 256 forward the RTP data packets, as specified by the session router 253, eventually converging on the destination location 258 where the even and odd numbered packets arrive. Therefore, the RTP data packets utilize two paths in traversing from the source of the RTP data packets to the destination 258 of the RTP data packets, from ingress, to the communication network 102, to egress. If the second multi-media router 256 fails, the first multi-media router 252 and the destination 258 of RTP data packets receives only the even packets, in both directions.

Since, in accordance with the present example, only even RTP data packets are received, it is apparent that the odd path is not functioning, thereby signifying that the odd RTP data packets may be sent to the third multi-media router 258 as well. Therefore, the RTP data packet load is distributed evenly, until a link or multi-media router failure occurs on the path of the second multi-media router 256, at which point the RTP data packet load transfers to the path managed by the third multi-media router 254. It should be noted that this is an example of a communication network and is not intended to limit the number of sources, multi-media routers, data paths, session routers, or destinations.

The modulo division method provides a mechanism of having more than two paths for load sharing. Therefore, if the number of paths is, for example, three, RTP data packet sequence numbers zero, three, six, nine, etc. are placed on a first path. In addition, RTP data packet sequence numbers one, four, seven, ten, etc. are placed on a second path, and sequence numbers two, five, eight, eleven, thirteen, etc. are placed on a third path.

The following provides reference to the use of the secondary path arrangement for rapid routing. When a primary path is allocated using session routing through a multi-domain network, an example of which is described by the pending application entitled, "System and Method for Assisting in Controlling Real-Time Transport Protocol Flow Through Multiple Networks," and multi-media routers are used to forward packets at various locations, an equally viable secondary path may be allocated. Therefore, each multi-media router is provisioned with a primary translation and a secondary translation. The following provides an example of the secondary path arrangement. In accordance with the example, the following command from a session router to a multi-media router setting up a multi-media flow is considered.

EXAMPLE

Multi-media Router Command
    Inbound Packet
        Primary
            source address 129.0.0.1:3000 (IP address and Port)
            destination address 130.0.0.1:5000
        Secondary
            source address 128.0.0.1:3000
            destination address 126.0.0.2:1400
    Outbound Packet
        Primary
            source address 131.0.0.1:3000
            destination address 132.0.0.2:4000
        Secondary
            source address 133.0.0.1:1000
            destination address 134.0.0.1:7000

It should be noted that in accordance with the above provided example, packets received from either the primary or secondary address pairs are assumed as part of a single RTP data packet flow. Thus, packets arriving at a link that have, either the primary source and destination pair, or the secondary source and destination pair are translated. The translation is to either the primary or secondary outbound address. Specifically, if an RTP data packet arrives with a source address of 129.0.0.1:3000 and a destination address of 130.0.0.1:5000, the packet is translated to either source address 131.0.0.1:3000 and destination address 132.0.0.2:4000, or source address 133.0.0.1:1000 and destination address 134.0.0.1:7000. Selection of either the primary or secondary translation is preferably based on a determination of failure as outlined above with reference to flow interruption detection and link failure detection.

The following describes use of the newly routed path arrangement for rapid routing. The newly routed path arrangement allocates a new address on the outbound side of a multi-media router upon detecting a failure in the forwarding path. The multi-media router preferably reports the failure in the forwarding path to a session router, where a new forwarding path is allocated. The session router then transmits a new path back to the multi-media router with a reconnect indication.

With reference to the network oriented route around arrangement, discrete network addresses are used to target different paths through a network and OSPF based routing is used to have either a dual path or load share arrangement of RTP traffic. OSPF can be used to flow packets evenly over several links. By setting the distance value on links carefully, multi-media routers can load share to a common destination. Additionally, with BGP-4, by carefully managing advertised and accepted reachable routes one can also low traffic over multiple links. In both OSPF and BGP-4 cases, if one link fails, the other absorbs the balance of the traffic.

Referring back to FIG. 3, the multi-media router 118 may be configured at a system level. This means of configuration preferably is performed via a command line entered from the input devices 166. Multi-media router configuration may include boot information for the multi-media router 118 that comprises boot source information, and system information, that includes system identification (assigned by an administrator), user logins and/or passwords, and link IP addresses. This information may be stored within the network processor memory.

Monitoring of the multi-media router 118 may also be provided. One example of a monitoring method may comprise the multi-media router supporting a set of management information bases (MIBs) that are accessible through simple network management protocol (SNMP). As known in the art, a MIB provides a definition of management items for a network component that can be accessed by a network manager. Monitoring of the multi-media router 118 may also be provided by a session router collecting monitoring information from the multi-media router 118 through event messages. Event messages may be generated when an event occurs on a flow. For instance, if a flow is interrupted, or the jitter increases beyond an acceptable limit defined by an administrator, then an event may be generated and forwarded to the session router. If necessary, the event may be used by a session router to re-route traffic.

Figure 6:
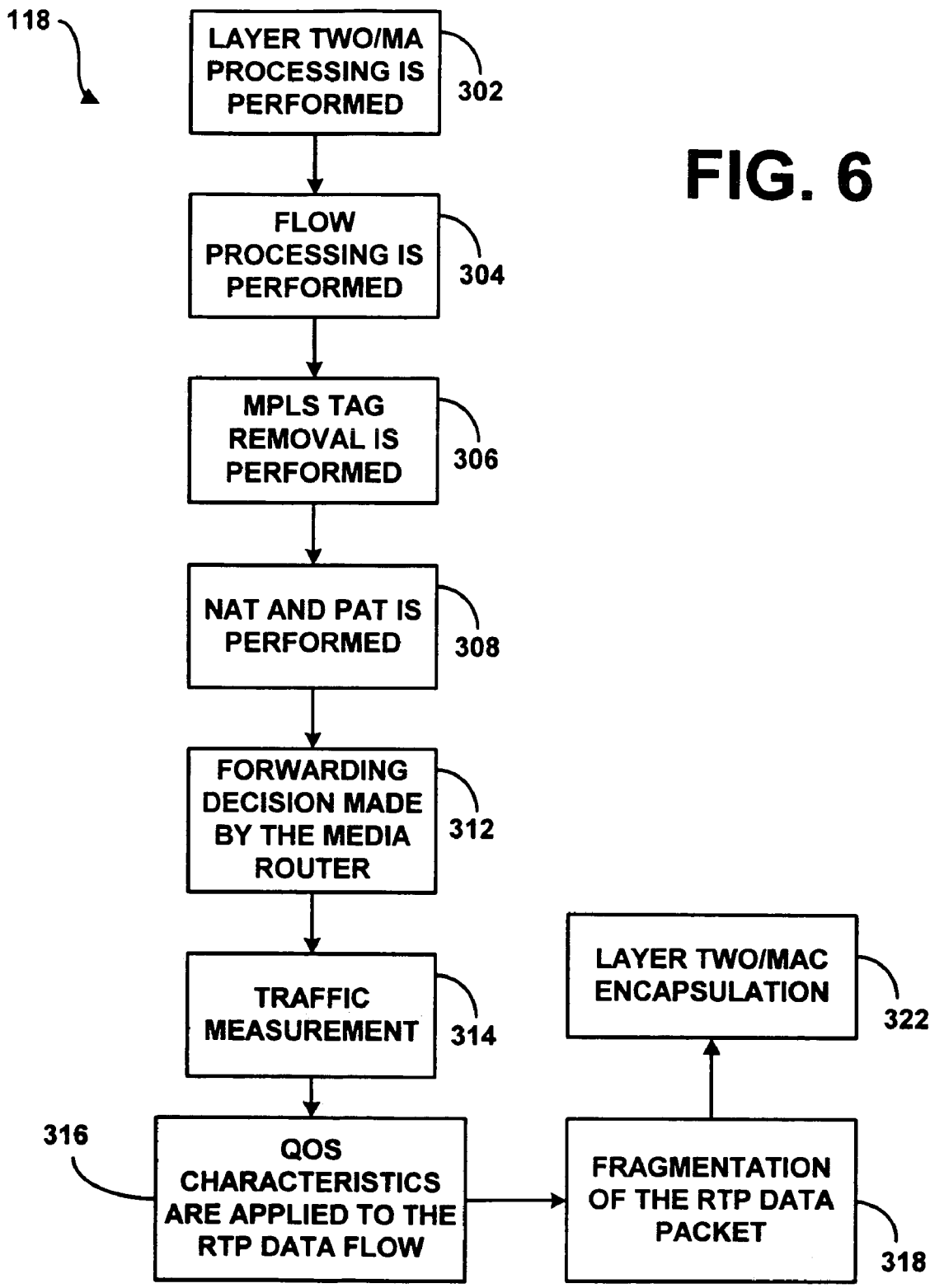
FIG. 6 is a flow chart that shows the architecture, functionality, and operation of a possible implementation of the multi-media router of FIG. 3 in addition to discrete processing steps that an RTP data flow packet may experience as it traverses the present rerouting system.

FIG. 6 is a flow chart that shows the architecture, functionality, and operation of a possible implementation of the multi-media router 118 (FIG. 1) and discrete processing steps that an RTP data flow packet may experience as the packet traverses the rerouting system 102. In this regard, each block represents a module, segment, or portion of code, which comprises one or more executable instructions for implementing the specified logical function(s). It should also be noted that in some alternative implementations, the functions noted in the blocks may occur out of the order noted. For example, two blocks shown in succession may in fact be executed substantially concurrently or the blocks may sometimes be executed in the reverse order, depending upon the functionality involved, as will be further clarified hereinbelow.

As shown by block 302, when an RTP flow data packet is received by the multi-media router 118 (FIG. 1), layer two/ multi-media access control (MAC) processing is performed. During layer two/MAC processing, a level two header, such as, but not limited to, a link protocol header, or layer two header, is removed from the received data packet. An example of a link protocol header may include, but is not limited to, an Ethernet header or HDLC header. The layer two header is removed so that a layer three header within the data packet may be examined by the multi-media router 118 (FIG. 1). As known in the art, the layer three header comprises IP source and destination addresses, and IP source and destination ports, as assigned by a session router or directly assigned to the multi-media router 118 (FIG. 1). The layer three header is then validated by performing standard IP processing for purposes of ensuring that the RTP flow data packet is properly formed and valid. Since those skilled in the art will know what processes are included in IP processing, further discussion of the process is not provided herein.

Figure 7:
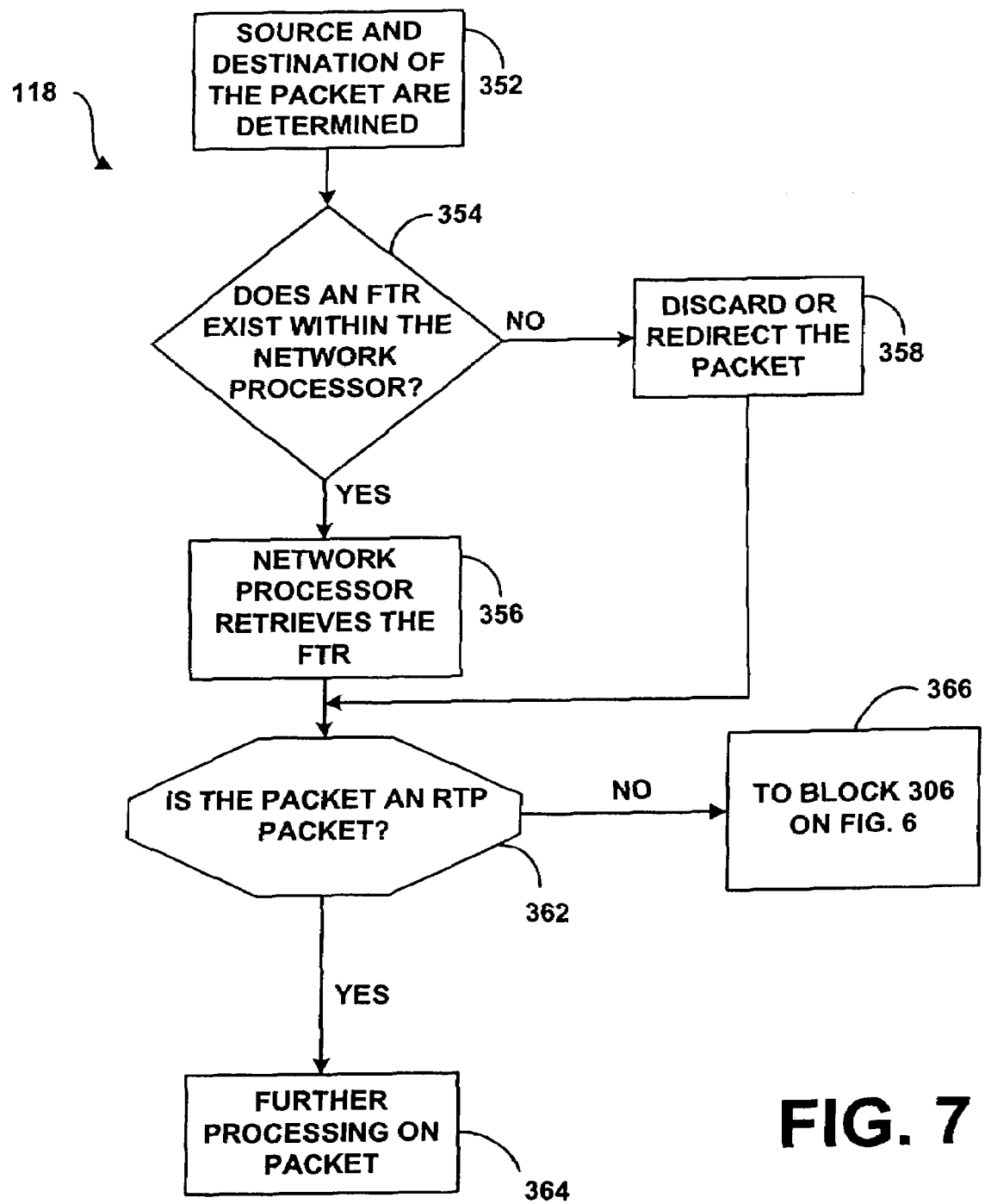
FIG. 7 is a flowchart that further illustrates the flow processing step of FIG. 6.

As shown by block 304, after layer two/MAC processing has been performed, flow processing is performed. FIG. 7 is a flowchart that illustrates flow processing in detail. As shown by block 352, during flow processing, the source and destination IP address and port of the packet are determined. Preferably, network address translation technology is used to determine flow direction. RTP data packet flows may come in two different directions, namely, outbound from a client to the multi-media router 118 (FIG. 1) and inbound from the multi-media router 118 (FIG. 1) to the client.

Once the source and destination IP address and port of the packet is identified, a determination is made as to whether a flow transform record (FTR) exists within the network processor (block 354). In accordance with the preferred embodiment of the invention, the FTR is continuously updated by the session router each time a new flow is determined. Alternatively, the FTR may be updated in intervals after a predetermined time limit. Also, updating of the FTR may be provided directly through the multi-media router 118 (FIG. 1). Other methods of updating the FTR may also be used.

As shown by block 356, if an FTR exists, the network processor 158 (FIG. 3) retrieves the FTR, as defined by a session router. It should be noted that the FTR instructs whether to translate the address of the source, the destination, or both the source and destination. Further, the FTR indicates whether a multi-protocol label switching (MPLS) tag should be inserted within the RTP data packet. Preferably, but not necessarily, a content adjustable memory (CAM) is used to retrieve the FTR. The CAM either directly returns the FTR or returns an address within a table located within the network processor 158 (FIG. 3). An example of such a table is a synchronous dynamic random access memory (SDRAM) table.

If, however, no FTR entry exists within the network processor 158 (FIG. 3), an exception exists which is handled by either discarding the packet or redirecting the packet to the host processor 164 (block 358). Specifically, a packet that does not have an FTR may be redirected to the host processor 164 to allow the host processor 164 to perform actions out of band from the packet forwarding being done on the network processor 158. These actions may include logging the source and contents of the packet and/or performing a notification to a management system. As shown by block 362, once the lookup has been performed for the packet, the packet is checked to determine whether the packet is an RTCP packet. If the packet is an RTCP packet, further processing is performed on the packet (block 364). Processing on an RTCP packet may include extracting jitter and packet loss statistics as well as the sender timestamp in order to determine latency. If, however, the packet is not an RTCP packet, the packet continues to be processed in the flow described by FIG. 6 provided hereinbelow (block 366).

Referring back to FIG. 6, after flow processing has been performed (block 304), multi-media protocol label switching (MPLS) tag removal is performed (block 306). In accordance with the preferred embodiment of the invention, MPLS tag removal is performed by the network processor 158 (FIG. 3) if specified by the FTR.

As is shown by block 308, after MPLS tag removal has been performed, network address translation (NAT) and port address translation (PAT) is performed. During NAT and PAT processing, the RTP data flow packet is further examined. A translation of the source address, destination address and port address is then performed on the RTP data flow packet, in accordance with parameters provided by a session router. Preferably, although not necessarily, separate tables are provided within the network processor memory for storing and maintaining each of the above mentioned addresses.

In accordance with the preferred embodiment of the invention, a forwarding decision is then made by the multi-media router (block 312). The option of performing a forwarding decision is provided to accommodate for situations where more than two links are provided within the multi-media router 118 (FIG. 1). In the absence of the flow being configured for IP forwarding, the session router will have configured a static forwarding interface in the connection information in the FTR. To summarize, an RTP data packet may be routed out of the communication system using an IP routing table, which provides a dynamic forwarding characteristic, or "no routing" can be specified and the packet will be sent out a particular link.

As shown by block 314, traffic measurement is then performed in accordance with the received RTP data flow packet. A detailed explanation of traffic measurement procedures has been provided hereinabove with reference to the description of the flow quality management engine 162 (FIG. 3). Each of the statistics measured by traffic measurement, namely, latency, jitter, and dropped packet processing, is stored within the network processor memory.

As shown by block 316, quality of service (QOS) characteristics are then applied to the RTP data flow. Use of QOS characteristics allows for premium RTP data packet flows and guaranteed bandwidth by providing per flow policing and shaping.

In accordance with the preferred embodiment of the invention, fragmentation of the RTP data packet is then performed (block 318). Fragmentation is provided by the multi-media router 118 (FIG. 1) for purposes of decreasing the size of the RTP data packet through the multi-media router 118 (FIG. 1). As an example, if the RTP data packet is already at a maximum transit unit (MTU) size when the packet enters the multi-media router 118 (FIG. 1), then it may be necessary for it to be fragmented before transmission to a destination endpoint. This process comprises replicating the IP header, setting the fragmentation flag in it, and/or splitting the payload between the packets.

As shown by block 322, a layer two/MAC encapsulation is then performed by the multi-media router 118 (FIG. 1), wherein, the data link (layer 2) header is re-added to the RTP data flow packet prior to transmission out of the multi-media router 118 (FIG. 1).

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

What is claimed is:

1. A system for rapid rerouting of real-time multi-media packet flows, the system comprising:
   a transceiver;
   at least one memory having stored thereon program code; and
   at least one processor that is programmed by at least the program code to enable the system to:
      receive a data packet corresponding to one of a plurality of packet flows between a source endpoint and a destination endpoint, wherein each endpoint comprises a network address and source port;
      determine a source address and a translated destination address for each data packet;
      select, when more than one path to the translated destination address is available, one forwarding destination for each data packet from a plurality of forwarding destinations, based on flow quality statistics for the flow corresponding to the data packet; and
      select an intermediate forwarding destination for the data packet based on a sequence number of the packet within the flow.

2. The system of claim 1, wherein the processor is programmed by at least the program code to enable the system to:
   select an intermediate forwarding destination based on the packet flow sequence number modulo a number of intermediate forwarding destinations.

3. The system of claim 1, wherein the processor is programmed by at least the program code to enable the system to:
   receive a return data packet from a final destination containing notification of a transmission failure;
   modify allocation of intermediate forwarding destinations to avoid the transmission failure.

4. A system for rapid rerouting of real-time multi-media packet flows, the system comprising:
   means for receiving a data packet corresponding to one of a plurality of packet flows between a source endpoint and a destination endpoint, each endpoint defined by a network address and source port;
   means for determining a destination address for the data packet;
   means for selecting, when more than one path to the destination address is available, one forwarding destination for the data packet from a plurality of forwarding destinations, based on flow quality statistics for the flow corresponding to the data packet; and
   means for selecting an intermediate forwarding destination for the data packet based on a packet flow sequence number modulo a number of intermediate forwarding destinations.

5. The system of claim 4, further comprising:
   means for receiving a return data packet from a final destination containing notification of a transmission failure;
   means for modifying allocation of intermediate forwarding destinations to avoid the transmission failure.

* * * * *